Figure 1:
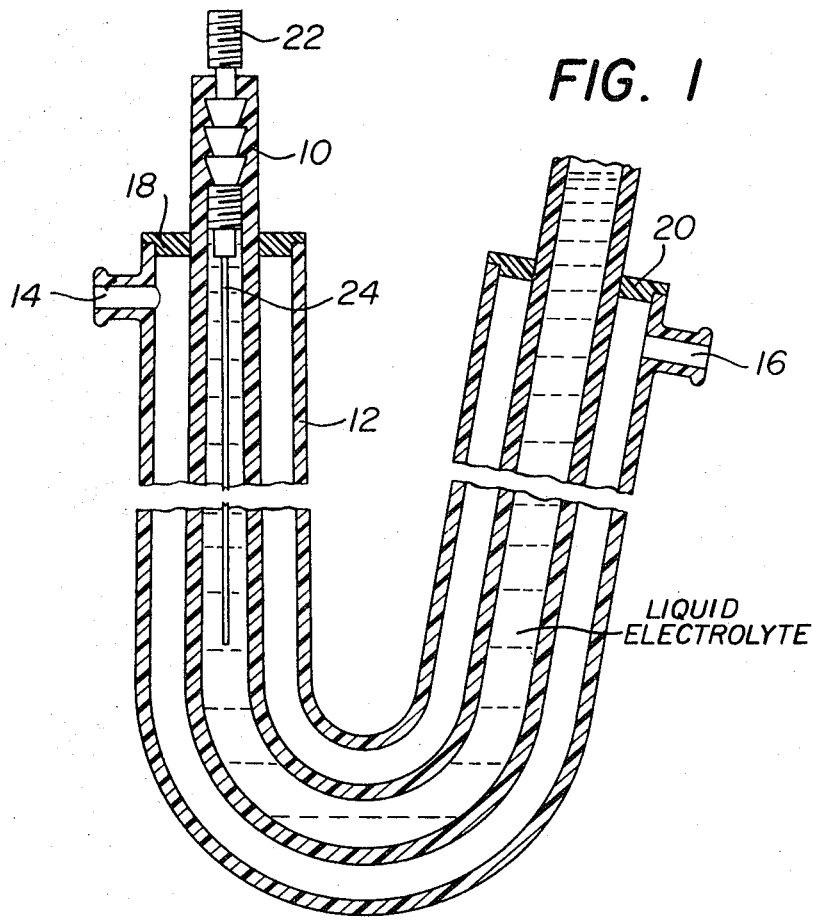

//  # United States Patent [11] 3,601,519

| [72] | Inventors | Maurice Paul Wanner<br>Geneva, Switzerland;<br>Neil Rudolph Wallis, Goring on Thames,<br>England |
|---|---|---|
| [21] | Appl. No. | 36,027 |
| [22] | Filed | May 11, 1970 |
| [45] | Patented | Aug. 24, 1971 |
| [73] | Assignee | Aerocoat S. A.<br>Geneva, Switzerland |
| [32] | Priority | May 14, 1969 |
| [33] | | Switzerland |
| [31] | | 7,465/69 |

[54] ELECTROLYTIC CONDUCTOR
9 Claims, 3 Drawing Figs.

[52] U.S. Cl. .................................................... 174/9 F,
 118/621, 174/15 C, 239/15
[51] Int. Cl. .................................................... H01b 1/00,
 B05b 5/00
[50] Field of Search ............................................ 174/9 R, 9
 F, 15 C; 338/27, 38, 44, 56, 80, 222; 317/3;
 323/99; 329/196; 219/71; 239/15; 117/93.4 R;
 118/621

[56] References Cited
UNITED STATES PATENTS
2,222,574 11/1940 Robertson .................... 174/15 C
3,412,198 11/1968 Wallis .......................... 174/9

Primary Examiner—Laramie E. Askin
Attorney—Molinare, Allegretti, Newitt and Witcoff ABSTRACT: In an electrolytic conductor for connecting a high voltage direct current source to a utilization device and comprising a flexible tube which contains an electrolyte and whose ends are fitted with electrodes in contact with the electrolyte, the space inside the tube that holds the electrolyte is made to have a cross section which progressively increases from the end of the tube intended to be connected to the current source, as by tapering the inner surface of the tube.

PATENTED AUG 24 1971          3,601,519

LIQUID ELECTROLYTE

MAURICE PAUL WANNER
NEIL RUDOLPH WALLIS
INVENTORS

Molinare, Allegretti,
Newitt & Witcoff
Attorneys

ELECTROLYTIC CONDUCTOR

This invention relates to an electrolytic conductor.

It is known to connect a high voltage direct current source to a utilization device, e.g. a manual electrostatic painting gun, by means of an electrolytic conductor. Such a conductor preferably comprises a flexible tube of insulating and impermeable material which contains an electrolyte consisting of a nonconductive liquid in which a metal salt is dissolved, the ends of the tube being closed off in fluidtight manner by plugs each fitted with an electrode in contact with the liquid, these electrodes being made of the same metal as that of the salt. Such a conductor is in particular described in U.S. Pat. No. 3,412,198. Among the advantages of such conductors may be cited the elimination of the problem posed by the capacitive resistance of the cables used to establish this connection, the possibility of adjusting in a highly accurate manner the conductivity of the conductor by varying the amount of salt dissolved in the liquid, and the stability of the conductor's characteristics during operation.

However, this stability is to some extent influenced during use by the fact that the electrolytic action taking place inside the conductor gives off heat, and the effect of this heat is to decrease the resistance of the electrolytic solution and hence to increase its conductivity. Now, this conductivity must remain very small and for this conductivity not to exceed an acceptable level the resistance must, depending on the case, be of about 600 megohms or more, so that any action tending to decrease this resistance is basically detrimental.

To counteract the effect of this heating action, the conductor should be cooled over at least the major portion of its length but since the length of the conductor is quite substantial—about 5 to 15 meters for electrostatic painting purposes for which voltages of about 100 kv. are generally required—such cooling is very difficult to achieve if the conductor is still to retain a certain degree of flexibility, this being essential when the conductor serves to supply current to a utilization device which must be handled with ease such as a painting gun, for the means which would enable such cooling (e.g. an air jacket) would render the conductor a lot heavier.

According to the present invention there is provided an electrolytic conductor for connecting a high voltage direct current source to a utilization device, comprising a flexible tube which contains an electrolyte and whose ends are closed off in fluidtight manner, and further comprising, at said ends, electrodes in contact with the electrolyte, wherein the cross section of the space inside the tube that holds the electrolyte progressively increases from the end of the tube which is intended to be connected to the current source.

In this way, the major proportion of the conductor's resistance can be concentrated in a relatively short portion thereof, i.e. less than half, in the vicinity of the source, so that a corresponding proportion of the heating action will take place along this portion. In these circumstances, it suffices to apply cooling means only to this portion of the conductor to maintain the overall resistance of the latter to a practically constant level.

Figure 2:
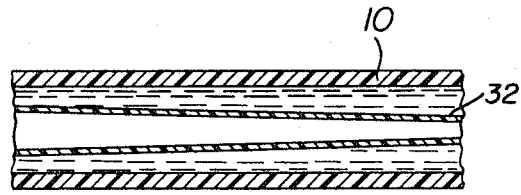
Figure 3:
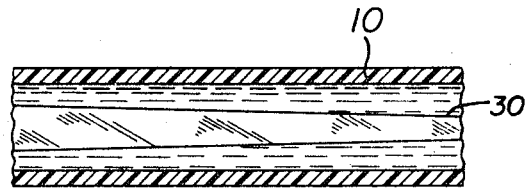

In the accompanying diagrammatic drawings:

FIG. 1 is an axial section through the initial portion of a first form of embodiment of the conductor according to the invention; and FIGS. 2 and 3 are axial sections also of an intermediate portion of two other forms of embodiment of the conductor according to the invention. The conductor whose initial portion is shown in FIG. 1, comprises a flexible tube 10, made of nylon or polyethylene, which contains a mixture of glycerine and water with copper sulfate in solution therein. The internal diameter of the tube increases progressively from the illustrated initial portion to its other end, intended to be connected to a utilization device, which will here be assumed to be an electrostatic painting gun. These internal dimensions of the tube vary from case to case in dependence on the length of the conductor and on the overall resistance that is required. If, for a given length of conductor, a mean internal cross section of, say, 0.3 cm.$^2$ is needed to achieve a particular resistance, the tube may have an internal cross section of 0.2 cm.$^2$ in the vicinity of the current source, an internal cross section of 0.3 cm.$^2$ at its middle and an internal cross section of 0.4 cm.$^2$ in the vicinity of the gun. By judiciously choosing these internal cross sections, the major proportion of the resistance, e.g. two-thirds, can be arranged to be provided by the electrolytic solution contained in a relatively short portion of the tube, e.g. one-fourth. It follows therefore that a corresponding proportion of the heat that is generated, in this instance two-thirds, will be generated along this relatively short portion of the tube.

In order to eliminate this heat, the initial portion of the tube, e.g. one quarter, is provided as shown in FIG. 1 with an air jacket 12, the air entering the jacket through an inlet 14 and issuing therefrom through an outlet 16. This jacket may be made of the same material as the tube 10 and be secured thereto by means of washers 18 and 20.

Instead of an air cooling jacket, it is clear that other cooling means may be resorted to, e.g. air-cooling means that are provided actually inside a high voltage generator to which the tube 10 is to be connected, as by means of a connector 22 of conductive material, such as brass, fluidtightly secured in the end of the tube. It is to be noted that a similar connector is provided at the other end of the tube to enable the latter to be connected to the gun.

It has been found that during the electrolytic action that takes place inside the tube when in use, gases were given off, particularly in the vicinity of the electrode 24, and that these gases could accumulate in an intermediate portion of the tube 10 to cause an undesirable interruption in the electrolytic solution. By directing the initial portion of the tube 10 first downwards, as shown in FIG. 1, these gases are made to accumulate around the electrode 24 and by providing the latter with a sufficient length, its tip, which constitutes the operative part of the electrode, will always remain in contact with the electrolytic solution.

In the embodiments illustrated in FIGS. 2 and 3, instead of modifying the internal diameter of the tube 10 to impart to the solution it contains a progressive variation of its cross section, there is inserted into the tube 10 an element of circular cross section which extends over the entire length thereof and whose external diameter progressively decreases from the end of the tube that is intended to be connected to the generator of said voltage towards the end that is meant to be connected to the gun. In FIG. 3, this element is embodied by a solid core 30, made for example of nylon. In FIG. 2, this element is embodied by a tube 32, made for example of polyethylene, whose ends (not visible) are closed off in fluidtight manner and which is filled with air. The initial portions of these two other embodiments can of course also be provided with air circulation cooling means.

According to a fourth embodiment, not shown, the features of the first and second embodiments or of the first and third embodiments could be combined.

We claim:

1. An electrolytic conductor for connecting a high voltage direct current source to a utilization device, comprising a flexible tube which contains an electrolyte and whose ends are closed off in fluidtight manner, and further comprising, at said ends, electrodes in contact with the electrolyte, wherein the cross section of the space inside the tube that holds the electrolyte progressively increases from the end of the tube which is intended to be connected to the current source.

2. An electrolytic conductor according to claim 1, wherein the tube has an internal diameter which progressively increases from the end intended to be connected to the current source.

3. An electrolytic conductor according to claim 1, wherein the tube surrounds an element whose external diameter progressively decreases from the end of the tube which is intended to be connected to the current source.

4. An electrolytic conductor according to claim 3, wherein said element consists of a tube whose ends are closed off in fluidtight manner and which is filled with air.

5. An electrolytic conductor according to claim 1, wherein a portion of the tube, extending from the end intended to be connected to the current source, is provided with cooling means.

6. An electrolytic conductor according to claim 1 including means for cooling said tube adjacent said current source end, said means for cooling extending along said tube for a distance less than one-half the length of said tube.

7. An electrolytic conductor according to claim 1, wherein said current source end initially extends downwardly.

8. An electrolytic conductor according to claim 1 wherein said electrode at said current source end includes a portion which extends from said current source end into said electrolyte.

9. An electrolytic conductor according to claim 1 wherein said tube is of substantially uniform internal diameter and wherein said tube surrounds an element whose external diameter progressively decreases from the end of the tube which is intended to be connected to the current source.